(12) United States Patent
Hohlbein

(10) Patent No.: US 6,996,870 B2
(45) Date of Patent: Feb. 14, 2006

(54) CONTOURING TOOTHBRUSH HEAD

(75) Inventor: Douglas J. Hohlbein, Pennington, NJ (US)

(73) Assignee: Colgate-Palmolive Company, New York, NY (US)

( * ) Notice: Subject to any disclaimer, the term of this patent is extended or adjusted under 35 U.S.C. 154(b) by 484 days.

(21) Appl. No.: 10/109,637

(22) Filed: Apr. 1, 2002

(65) Prior Publication Data

US 2002/0152570 A1 Oct. 24, 2002

Related U.S. Application Data

(63) Continuation-in-part of application No. 29/148,074, filed on Sep. 14, 2001, now Pat. No. Des. 456,139, and a continuation of application No. 09/897,606, filed on Jul. 3, 2001, which is a continuation of application No. 09/422,953, filed on Oct. 22, 1999, now Pat. No. 6,314,606, which is a continuation of application No. 09/351,178, filed on Jul. 12, 1999, now Pat. No. 6,073,299, which is a continuation of application No. 09/090,331, filed on May 29, 1998, now Pat. No. 5,991,958, which is a continuation of application No. 08/762,783, filed on Dec. 10, 1996, now Pat. No. 5,758,383.

(60) Provisional application No. 60/008,734, filed on Dec. 29, 1995.

(51) Int. Cl.
*A46B 3/22* (2006.01)
*A46B 9/10* (2006.01)

(52) U.S. Cl. ......................................... 15/110; 15/167.1
(58) Field of Classification Search ................... 15/110, 15/167.1, 172
See application file for complete search history.

(56) References Cited

U.S. PATENT DOCUMENTS 301,644 A 7/1884 Thompson
758,764 A 5/1904 Macleod (Continued)

FOREIGN PATENT DOCUMENTS

CA 2004029 5/1990
CH 460705 10/1968

(Continued)

OTHER PUBLICATIONS

"The Integral Hinge," "Poly–Pro" Polypropylene, Spencer Chemical Co., 1963.
"Guide for Injection Molding," Pro–fax polypropylene, , Himont U.S.A. Inc., Nov., 1987.
"Construeren in Kunststoffen Deel B," T. Delft, 1986.
"Poly–Pro Propylene" "The Integral Hinge", Spencer Chemical Co. (1963).
"Guide for Injection Molding Pro–fax Polymopylene" (1987).
"Construeren in Kunststoffen Deel B", T. Delft (1986).

*Primary Examiner*—Terrence R. Till
(74) *Attorney, Agent, or Firm*—Banner & Witcoff, Ltd.

(57) ABSTRACT

The present invention discloses a toothbrush having a handle and an articulated head coupled to the handle. The articulated head includes two sections and each of the head sections has a bottom surface and a side surface. Each of the head sections includes a plurality of bristles extending from the bottom surface of that head section and at least one of the head sections includes a plurality of elastomeric fingers partially defining the side surface of that head section and partially extending from the bottom surface of that head section. The head section most remote from the handle, in a normal configuration of the articulated head, is angled with respect to the other head section.

40 Claims, 14 Drawing Sheets

U.S. PATENT DOCUMENTS

| | | | |
|---|---|---|---|
| 759,490 A | 5/1904 | Yates | |
| 803,995 A | 11/1905 | Davenport | |
| 914,501 A | 3/1909 | McEachern | |
| 958,371 A | 5/1910 | Danek | |
| 1,007,328 A | 10/1911 | Brandstetter | |
| 1,022,920 A | 4/1912 | Anderson | |
| 1,251,250 A | 12/1917 | Libby | |
| 1,327,757 A | 1/1920 | Eggers | |
| 1,327,807 A | 1/1920 | Burleigh | |
| 1,369,966 A | 3/1921 | Cosens et al. | |
| 1,466,723 A | 9/1923 | Izawa | |
| 1,639,880 A | 8/1927 | Butler | |
| 1,860,924 A | 5/1932 | Cooke | |
| 1,924,152 A | 8/1933 | Cooney et al. | |
| 1,927,365 A * | 9/1933 | Frolio | 15/167.1 |
| 1,928,328 A | 9/1933 | Carpentler | |
| 1,976,271 A | 10/1934 | Vachoux | |
| 2,003,243 A | 5/1935 | Campbell et al. | |
| 2,028,011 A | 1/1936 | Raymond | |
| 2,042,239 A | 5/1936 | Planding | |
| 2,097,987 A | 11/1937 | Phillips | |
| 2,117,174 A * | 5/1938 | Jones | 15/110 |
| 2,139,245 A | 12/1938 | Ogden | |
| 2,209,173 A | 7/1940 | Russell | |
| 2,225,331 A | 12/1940 | Campbell | |
| 2,254,365 A | 9/1941 | Griffith et al. | |
| 2,266,195 A | 12/1941 | Hallock | |
| 2,326,632 A | 8/1943 | Friedman | |
| 2,438,268 A | 3/1948 | Bressler | |
| 2,443,297 A | 6/1948 | Bressler | |
| 2,631,320 A | 3/1953 | Bressler | |
| 2,650,383 A | 9/1953 | Bressler | |
| 2,676,350 A | 4/1954 | Bressler | |
| 2,685,703 A | 8/1954 | Dellenbach | |
| 2,702,914 A | 3/1955 | Kittle | |
| 2,796,620 A | 6/1957 | Bressler | |
| 2,797,424 A | 7/1957 | Olson | |
| 3,103,027 A * | 9/1963 | Birch | 15/110 |
| 3,152,349 A | 10/1964 | Brennesholtz | |
| 3,174,174 A | 3/1965 | Dengler | |
| 3,188,672 A | 6/1965 | Gary | |
| 3,230,562 A | 1/1966 | Birch | |
| 3,253,292 A | 5/1966 | Herschensohn | |
| 3,320,225 A | 5/1967 | Bradbury | |
| 3,398,421 A | 8/1968 | Rashbaum | |
| 3,553,759 A | 1/1971 | Kramer et al. | |
| 3,643,282 A | 2/1972 | Lechene et al. | |
| 3,722,020 A | 3/1973 | Hills | |
| D226,942 S | 5/1973 | Okuda | |
| 3,739,419 A | 6/1973 | Natman et al. | |
| 3,900,550 A | 8/1975 | Oliver | |
| D255,511 S | 6/1980 | Hill et al. | |
| 4,274,174 A | 6/1981 | Ertel | |
| 4,277,862 A * | 7/1981 | Weideman | 15/110 |
| 4,288,883 A | 9/1981 | Dolinsky | |
| 4,369,284 A | 1/1983 | Chen | |
| 4,488,328 A | 12/1984 | Hyman | |
| 4,520,526 A | 6/1985 | Peters | |
| 4,535,014 A | 8/1985 | Wright | |
| 4,563,381 A | 1/1986 | Woodland | |
| 4,566,145 A | 1/1986 | Wachtel | |
| 4,618,213 A | 10/1986 | Chen | |
| 4,654,922 A | 4/1987 | Chen | |
| 4,691,405 A | 9/1987 | Reed | |
| 4,712,266 A | 12/1987 | Yamaki | |
| 4,712,267 A | 12/1987 | Cheng | |
| 4,757,570 A | 7/1988 | Haeusser et al. | |
| 4,800,608 A | 1/1989 | Key | |
| 4,829,621 A | 5/1989 | Phenegar | |
| 5,001,803 A | 3/1991 | Discko, Jr. | |
| 5,040,260 A | 8/1991 | Michaels | |
| 5,052,071 A | 10/1991 | Halm | |
| 5,054,154 A | 10/1991 | Schiffer et al. | |
| 5,114,214 A | 5/1992 | Barman | |
| D335,579 S | 5/1993 | Chuang | |
| 5,262,468 A | 11/1993 | Chen | |
| 5,269,038 A | 12/1993 | Bradley | |
| 5,323,504 A | 6/1994 | McCusker | |
| 5,336,708 A | 8/1994 | Chen | |
| 5,339,482 A * | 8/1994 | Desimone et al. | 15/167.1 |
| 5,351,358 A | 10/1994 | Larrimore | |
| 5,371,915 A * | 12/1994 | Key | 15/167.1 |
| 5,373,602 A * | 12/1994 | Bang | 15/167.1 |
| 5,393,796 A | 2/1995 | Halberstadt et al. | |
| 5,398,366 A | 3/1995 | Bradley | |
| 5,465,450 A * | 11/1995 | Humphries | 15/172 |
| 5,483,722 A * | 1/1996 | Scheier et al. | 15/167.1 |
| 5,502,930 A | 4/1996 | Burkette | |
| 5,508,334 A | 4/1996 | Chen | |
| 5,511,277 A | 4/1996 | Simonds | |
| 5,618,882 A | 4/1997 | Hammond et al. | |
| 5,628,082 A | 5/1997 | Moskovich | |
| 5,630,244 A * | 5/1997 | Chang | 15/167.1 |
| 5,633,286 A | 5/1997 | Chen | |
| 5,651,158 A * | 7/1997 | Halm | 15/167.1 |
| 5,673,452 A * | 10/1997 | Chang et al. | 15/167.1 |
| 5,742,972 A * | 4/1998 | Bredall | 15/167.1 |
| 5,758,383 A * | 6/1998 | Hohlbein | 15/167.1 |
| 5,774,923 A * | 7/1998 | Halm | 15/167.1 |
| 5,836,033 A | 11/1998 | Berge | |
| 5,930,860 A | 8/1999 | Shipp | |
| 5,946,758 A * | 9/1999 | Hohlbein et al. | 15/167.1 |
| 5,946,759 A * | 9/1999 | Cann | 15/167.1 |
| 5,991,958 A | 11/1999 | Hohlbein | |
| 6,073,299 A | 6/2000 | Hohlbein | |
| 6,151,745 A | 11/2000 | Roberts et al. | |
| 6,311,358 B1 | 11/2001 | Soetewey et al. | |
| 6,314,606 B1 | 11/2001 | Hohlbein | |
| 6,599,048 B1 * | 7/2003 | Kuo | 401/269 |

FOREIGN PATENT DOCUMENTS

| | | | |
|---|---|---|---|
| DE | 1657299 A | 2/1971 | |
| DE | 2410175 | 9/1975 | |
| DE | 3628722 | 2/1988 | |
| DE | 3840136 | 5/1990 | |
| DE | 4339829 | 4/1994 | |
| DE | 9402125 | 7/1994 | |
| EP | 0336641 | 10/1989 | |
| EP | 0 360 766 | 3/1990 | |
| EP | 0371293 | 6/1990 | |
| EP | 0454625 | 10/1991 | |
| EP | 0648448 | 4/1995 | |
| EP | 0648448 | 9/1995 | |
| FR | 442832 | 9/1912 | |
| FR | 567187 | 6/1923 | |
| FR | 707727 | 7/1931 | |
| FR | 777340 | 2/1935 | |
| FR | 1100290 | 9/1955 | |
| FR | 1247433 | 2/1961 | |
| FR | 2652245 | * 3/1991 | |
| GB | 189335 | 12/1922 | |
| GB | 304459 | 2/1929 | |
| GB | 412414 | 7/1934 | |
| GB | 647924 | 12/1950 | |
| JP | 59-2224 | 1/1984 | |
| JP | 60-29527 | 2/1985 | |
| JP | 662303 | 7/1985 | |
| JP | 66-2303 | 7/1985 | |
| WO | WO 92/17092 | 10/1992 | |
| WO | WO 92/17093 | 10/1992 | |
| WO | WO 94/05183 | 3/1994 | |

| | | | | | | |
|---|---|---|---|---|---|---|
| WO | WO 94/09678 | 5/1994 | | WO | WO99/37181 | 7/1999 |
| WO | WO 96/02165 | 2/1996 | | WO | WO99/37182 | 7/1999 |
| WO | 9602165 | 2/1996 | | WO | WO00/49911 | 8/2000 |
| WO | WO96/15696 | 5/1996 | | WO | WO00/64307 | 11/2000 |
| WO | WO 97/25900 | 7/1997 | | WO | WO00/76369 | 12/2000 |
| WO | WO 97/95899 | 7/1997 | | WO | WO 03/030680 A | 4/2003 |
| WO | WO 98/07349 | 2/1998 | | | | |
| WO | WO 98/18364 A | 5/1998 | | * cited by examiner | | | though

CONTOURING TOOTHBRUSH HEAD

CROSS-REFERENCE TO RELATED APPLICATIONS

This application is a Continuation-in-Part that claims the benefit of U.S. patent application Ser. No. 29/148,074 (filed Sep. 14, 2001) (now U.S. Pat. No. D456,139S) and U.S. patent application Ser. No. 09/897,606 (filed Jul. 3, 2001 now U.S. Pat No. 6,442,787), which is a Continuation Application of U.S. patent application Ser. No. 09/422,953 (filed Oct. 22, 1999) (now U.S. Pat. No. 6,314,606), which is a Continuation Application of U.S. patent application Ser. No. 09/351,178 (filed Jul. 12, 1999) (now U.S. Pat. No. 6,073,299), which is a Continuation Application of U.S. patent application Ser. No. 09/090,331 (filed May 29, 1998) (now U.S. Pat. No. 5,991,958), which is a Continuation Application of U.S. Pat. Ser. No. 08/762,783 (filed Dec. 10, 1996) (now U.S. Pat. No. 5,758,383), which claims priority under 35 U.S.C. §119(e) of Provisional Application No. 60/008,734 (filed Dec. 29, 1995) (now abandoned), which applications are incorporated herein in their entireties.

BACKGROUND OF THE INVENTION

This invention relates to a toothbrush and more particularly to a toothbrush head construction wherein the head is designed and configured to yield a brushing surface conforming to curved sections of teeth and which is bendable to conform to straight teeth sections.

Prior toothbrush constructions include toothbrush heads having pivoted or articulated sections joined together in a variety of constructions, such as a resilient strip of metal or the like, and also include pivoted or hinged articulated sections to provide a curved bristle configuration.

A curved/angled bristle surface configuration offers improved access to hard-to-reach areas such as the lingual surfaces of the front teeth and behind the rear molars, placing more bristles in contact with the outer surfaces of the front teeth.

Many current brushes which have rigidly mounted bristles and a rigid curved/angled bristle surface exhibit an inherent disadvantage when brushing both flat as well as concave tooth surfaces. Placing a curved/angled bristle surface on flat tooth surfaces results in fewer bristles making contact with the teeth. These fewer bristles must support the brushing forces applied through the handle, which will result in premature splaying of the bristles. Some current toothbrushes have a "power tip" configuration (elongated rigidly mounted tip bristles) which are claimed to have improved access benefits.

SUMMARY OF THE INVENTION

According to the invention, an articulated toothbrush head is defined by two head sections joined by one or more thin bridges of the same resin from which the toothbrush is formed, as by molding, to produce an integral construction. These thin bridges permit limited flexing between the two head sections, the two sections normally being at a small angle with respect to each other. That portion of the head between the two head sections may be, in one embodiment, in the general form of a T shaped slot running transversely of the top surface of the head, from one side head side edge to another. The slot is filled, as by injection, with an elastomer to control and enhance flexing. The construction is such that the head section most remote from the handle is normally tilted with respect to the head section nearest the handle, the latter head section located at one end of the handle. In a second embodiment, the head section may assume the form of a narrow cylindrical portion, or in a third embodiment two thin bridges may be employed, both having elastomer.

An advantage of the present flexible configuration is, in addition to the above noted features of a curved configuration, its inherent gentleness on the gums. When one brushes along the gumline with a power tip configuration, one focuses much of the force through the concentrated area at the raised tip. With the present configuration, this force is more evenly distributed.

There are considerable manufacturing efficiencies with having the elastomer material of this invention used in the flex area being the same elastic material as that which may be used as a grip material in the handle area. Therefore, a configuration which allows flexing under the loads typically encountered during brushing with materials which are suitable for use as a grip would be desirable.

To achieve the flexibility described above, the cross section of elastomer may be convoluted, with one or more convolutes. To aid in fixing the elastomer to the toothbrush head sections, the elastomer may be configured to fit into one or more slots at both ends of the flexing area.

To minimize the gap between bristle tufts when the head is flexed into a flat configuration, it is desirable to position the plastic (resin) bridge between the tip and handle portions as near the bristle tips as possible. This bridge is straightened during flexing, and directly controls the gap between bristle tufts on each side of the flex area.

The present invention also provides a toothbrush including a handle and an articulated head coupled to the handle, the head including two sections. Each of the head sections has a bottom surface and a side surface and each of the head sections includes a plurality of bristles extending from the bottom surface of that head section. In one embodiment, at least one of the head sections includes a plurality of elastomeric fingers partially defining the side surface of that head section and partially extending from the bottom surface of that head section. The head section most remote from the handle, in a normal configuration of the head, may be angled with respect to the other head section. The elastomeric fingers are adapted, for example, to provide a massaging action against the gums when the toothbrush is applied along the gumline and the elastomeric fingers are contacted with the gums.

DETAILED DESCRIPTION OF THE INVENTION

Figure 1:
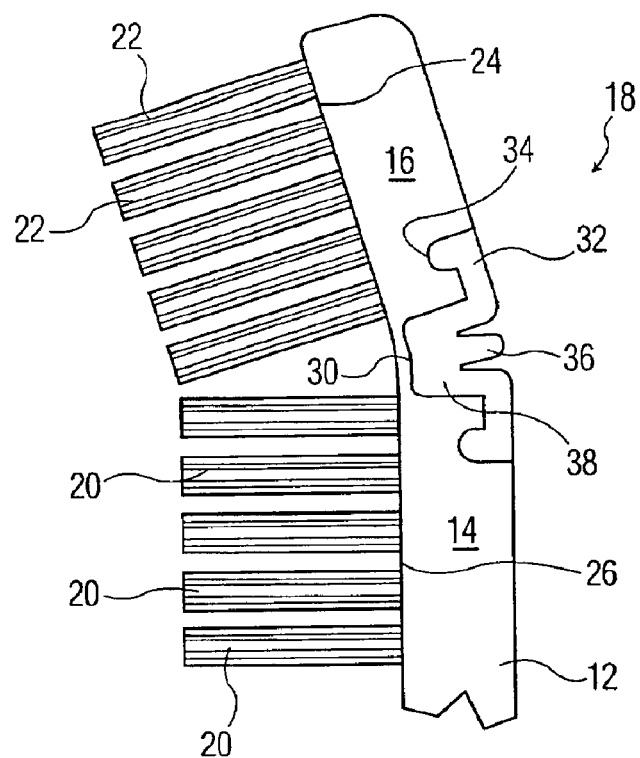
FIG. 1 is a side elevational view illustrating the toothbrush head of this invention according to a first embodiment.

Referring now to FIG. 1, a side elevational view of a toothbrush embodying the features and construction of this invention is shown in a vertical position, with a portion of the handle designated as 12. While not completely shown, the reader will understand that the handle extends downwardly and has a longitudinal axis. That portion of the head nearest the handle is designated as section 14 and is collinear with the handle, while that portion of the head most remote from the handle is designated as section 16. An elastomer section or joint between facing ends of sections 14 and 16 is denoted generally as 18. A plurality of tufts of bristles 20 extends at right angles to section 14, while a similar plurality of tufts of bristles 22 extends at right angles from section 16. Tufts of bristles 22 are thus at right angles to lower surface 24 of head section 16, while tufts of bristles 20 are perpendicular to lower or bottom surface 26 of head section 14.

Figure 2:
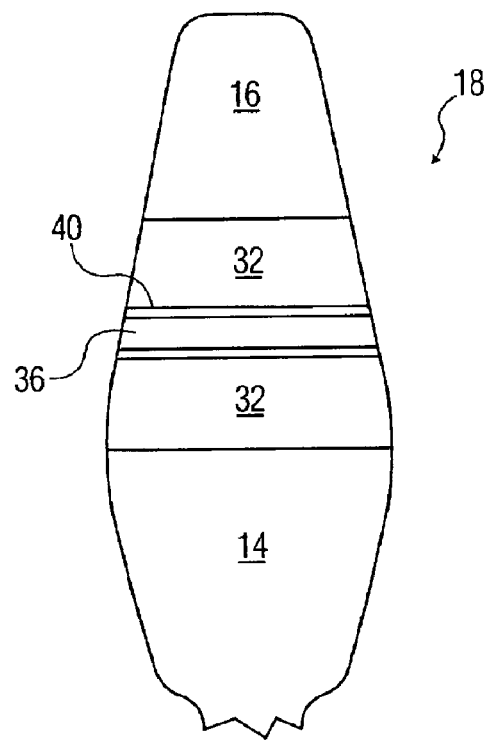
FIG. 2 is a top plan view of the toothbrush head shown at FIG. 1.

A generally T-shaped groove, in a longitudinal cross section, extends transversely across the upper or top surface of the head and is thus located between sections 14 and 16. The bottom of the central or main part of the groove is spaced from the lower surface of the composite head, leaving a thickness or bridge section designated as 30 which joins the lower portions of the two head sections. Bridge or zone 30 is typically of a thickness between 20 and 40 thousandths of an inch. The handle and head sections are molded from a plastic or resin such as polypropylene. The generally T shaped groove is filled with a resilient and soft thermoplastic elastomer. The T groove has two symmetrical wing portions 32, each terminating in an enlarged portion 34, the latter extending towards respective groups of tufts of bristles. The middle of the T shaped resin insert section 18 includes an integral ridge 36, while the lower portion or base portion of the T section is designated as 38. The thermoplastic elastomer which forms section 18 may be a thermoplastic vulcanate (TPV) consisting of a mixture of polypropylene and EPDM (ethylene propylene diene monomers) which is available as SANTOPRENE (brand), described in U.S Pat. No. 5,393,796 issued to Halberstadt et al, or VYRAM (brand), another TPV consisting of a mixture of polypropylene and natural rubber, both SANTOPRENE and VYRAM (brands) being elastomers marketed by Advanced Elastomer Systems. Other suitable elastomers include KRATON, a brand of styrene block copolymer (SBC) marketed by Shell, and DYNAFLEX G 6725 (brand), a thermoplastic elastomer marketed by GLS Corporation and which is made with KRATON (brand) polymer. These and other suitable elastomers have, typically, a Shore A hardness of from about 13 to 94, with 23 to 28 being a preferred hardness. Grooves 40, on the top surface of the composite head, extend on both sides of raised rib or ridge 36, and border sections 32. FIG. 2 further illustrates the construction. It is seen that elastomer section 18 spans the width of the head sections.

In the normal configuration of the head, it is seen that head section 16 is tilted with respect to head section 14 at an angle, typically about 18°. Thus, a force exerted on the brush during brushing is required to tilt section 16 if it is to be more nearly or completely aligned with section 14. The two head sections may be molded in their angled configuration as shown at FIG. 1, with the elastomer then added. Alternatively, the two head sections may be molded aligned with each other and then angled upon locating or injecting the elastomer between them.

Figure 3:
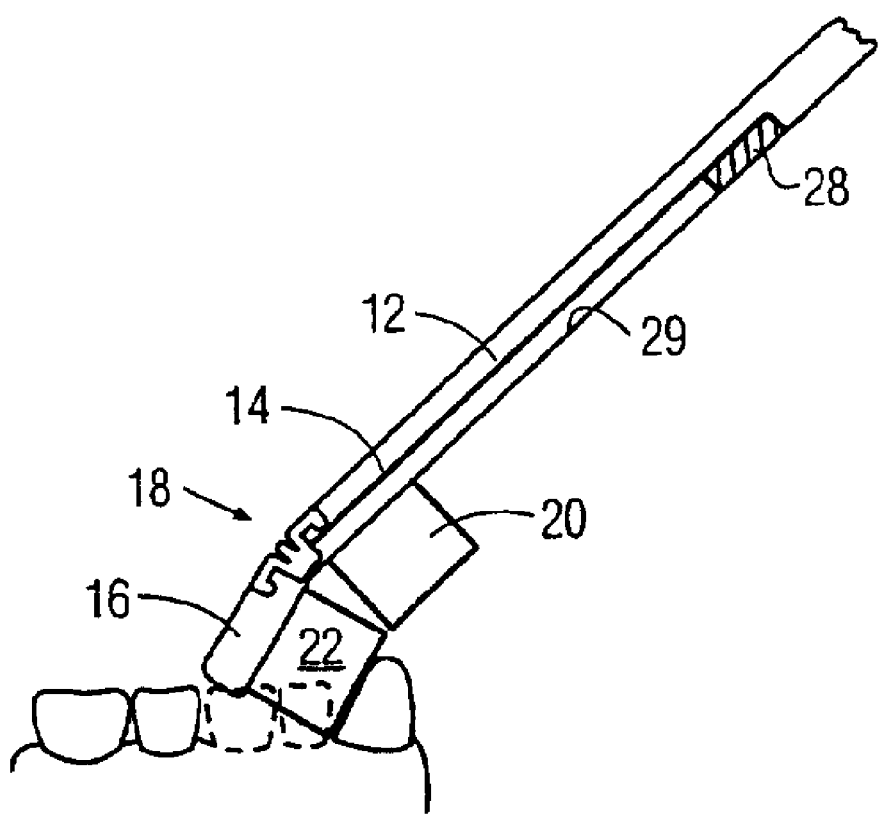
FIG. 3 is an elevational view showing the head and tufts of bristles as brushing the inside surfaces of the lower teeth.

Referring now to FIG. 3, it is seen that the effective curvature of the two head sections 14 and 16 offers improved access to inner and rear surfaces of the teeth. Thus, handle 12 need not be inclined as much as otherwise in order for forward section 16 and its bristles 22 to engage interior surfaces of the lower front teeth. In brushing a straight section of teeth, the deformability of the elastomer section 18 permits section 16 to partially or completely align itself with handle 12 and section 14.

Figure 4:
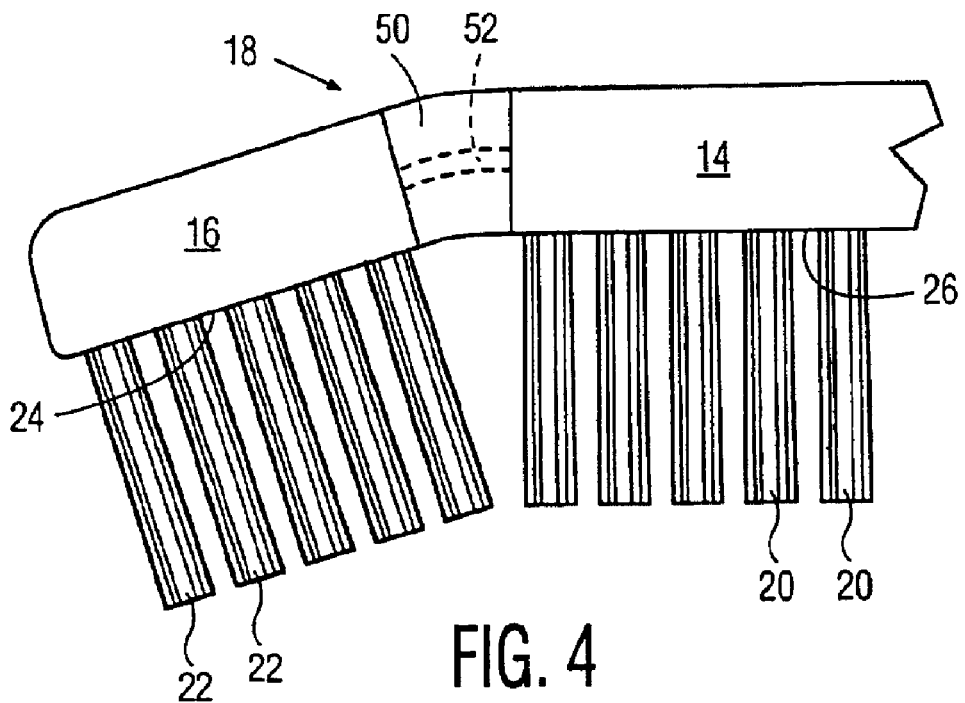
FIG. 4 is a view similar to FIG. 1 and slows an second embodiment.

FIG. 4 illustrates a second embodiment of the invention, there shown as horizontally disposed, and similar to that of FIGS. 1 and 2 except for a different construction for angularly joining the two head sections. The elastomer joint is again denoted as 18, with the elastomer itself denoted as 50 and being of the same composition as previously set out, and extends across the width of the head, and is located between the facing ends of sections 14 and 16. A thin integral bridge connection centrally between the two sections is designated as 52, typically being of cylindrical form in transverse cross section. Each end is integral with a respective head section. The elastomer is seen as completely surrounding bridge 52. This bridge connection may be, in transverse cross section, of any desired form. A top plan view of the head would be similar to FIG. 2, except for the absence of grooves 40 and rib 36. As seen at FIG. 4, the extent of the elastomer along the toothbrush longitudinal axis is shorter than that of FIGS. 1 and 2. Integral connection or bridge 52 performs the same function as bridge 30 of FIG. 1, namely, integrally joining the two head sections.

Figure 5:
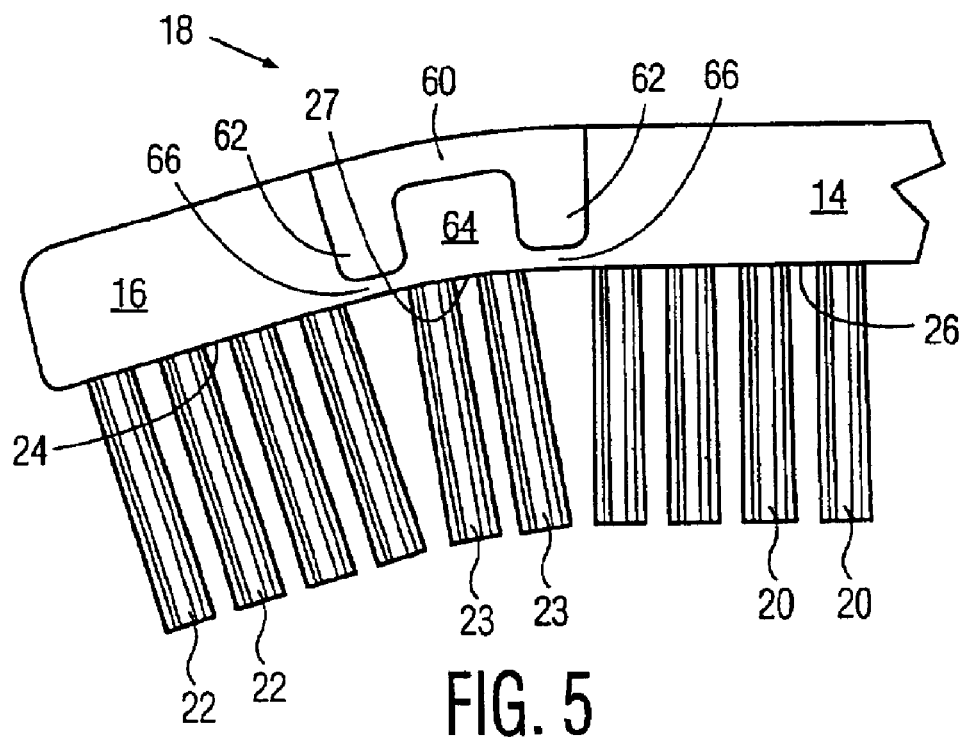
FIG. 5 is a view similar to FIG. 1 and shows a third embodiment.

FIG. 5 shows a third embodiment, again shown as horizontal. There, the lower surfaces 24 and 26 of bristled head sections 14 and 16 are joined by an intermediate arcuate bottom surface 27 having tufts of bristles 23 extending orthogonally and downwardly therefrom. An elastomer section 18 is generally C shaped and has a bight part 60 and tips or ends 62, the latter located in respective complementary double troughs or double grooves which extend transversely across the head. The elastomer tips are separated by head portion 64, with thin bridges 66, again formed from the molded resin forming the toothbrush, joining the two head sections at the lower surface of the whole head. The C shaped elastomer thus surrounds portion 64 across the width of the head.

The second and third embodiments yield the same cleaning action as shown at FIG. 3. The thickness of bridges 52 and 66 is the same as that of bridge 30 of FIG. 1.

It is seen that the bridges 30, 52 and 66 of the respective embodiments inhibit longitudinal separation of the two head sections by resisting tensile or other forces which might result in such separation, while the elastomer also controls the degree of flexing when head section 16 is subject to brushing forces. The function of the bridges is thus to tether the two head sections together, as well as to set them at an initial angle. When the sections move toward straightening or alignment, each elastomer section is deformed. Such deformation is resisted by the elastomer and to a lesser extent by the resin (polypropylene) bridges so that the sections revert to their normal, angled relationship upon the cessation of brushing force on forwardmost section 16.

Figure 6:
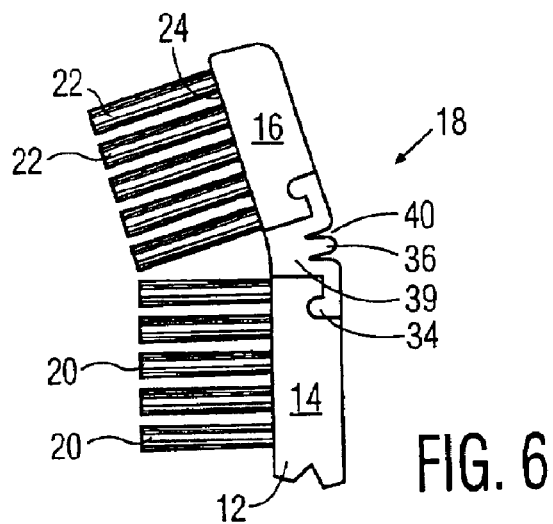
FIG. 6 is a side elevational view of a fourth embodiment.

FIG. 6 illustrates a fourth embodiment which differs from that shown in FIG. 1 only in the absence of bridge 30, of FIG. 1. Instead of bridge 30, the two head sections are coupled by T shaped elastomer section 39, the latter being of the same form as that of section 38 of FIG. 1, except that it extends all the way to the lower surface of the head.

Figure 7:
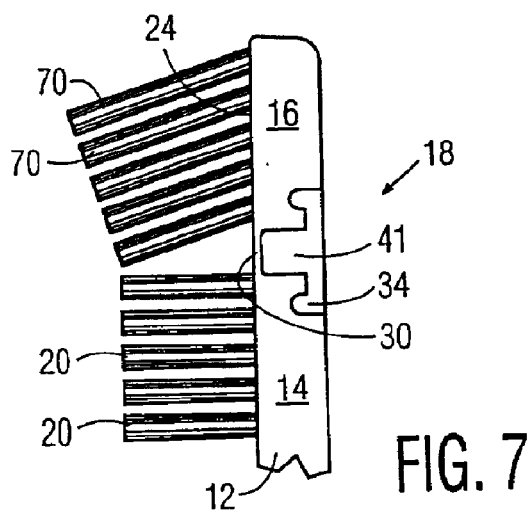
FIG. 7 is a side elevational view of a fifth embodiment.

FIG. 7 shows a fifth embodiment, here the two head sections 14 and 16 being normally aligned. A generally T shaped elastomeric section 41 forms a joint 18 which fills the spaces between the ends of the two head sections 14 and 16, except for bridge 30, identical with bridge 30 of FIG. 1, which integrally tethers the two head sections together. Tufts of bristles 70 are slanted with respect to lower head surface 24 of head section 16, the slanting being towards handle 12. Tufts 70 are of successively different lengths, with the longest being near the most remote free end or tip of the head section 16. It is seen that the tips, of bristle tufts 70 and 20 form a generally concave brushing surface which is at times, during brushing, flattened upon bending of joint 18.

Figure 8:
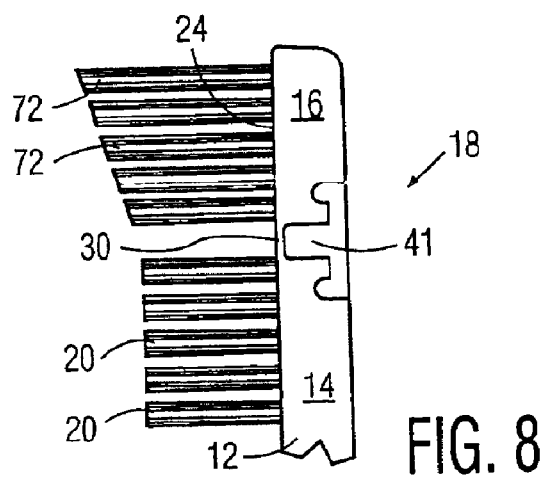
FIG. 8 is a side elevational view of a sixth embodiment.

FIG. 8 illustrates a sixth embodiment, similar to that of FIG. 7, and differs therefrom only in that the head section 16 tufts, here denoted as 72, extend orthogonally from surface 24. These latter tufts are, as tufts 70, of uniformly different lengths. The longest are near the free end of head section 16.

Again, the free ends of tufts 72 and 20 form a generally concave brushing surface which is at times, during brushing, flattened upon bending of joint 18.

Many toothbrushes available in the marketplace today are "dual component," by which is meant that an elastomeric material is used to a greater or lesser extent, particularly in the finger gripping portion of the brush. The method of manufacture of such dual component brushes by injection molding is thus exceedingly well known in the art today. The toothbrushes according to the present invention may be made by use of such conventional dual component technology. For example, in accordance with a first method of manufacturing brushes according to the present invention, the elastomeric material may be introduced into the head area from the handgrip area via a molded-in channel (assuming a handgrip area is required). Alternatively, the elastomer could be introduced into the head area via a second injection point or gate located at the head, thereby eliminating the need for a molded-in channel. The head may then be tufted using conventional staple technology.

In accordance with a second method of manufacturing brushes according to the present invention, the handle and elastomer for the grip and the head areas are molded using a three-shot molding technique. The elastomer is introduced into the head area separately from the handgrip area. This process is especially useful if the elastomer for the head section of the brush and the hand grip section are different elastomeric materials, such as elastomers having two different Shore hardness values. For example, in some circumstances, it may be desired to use a softer elastomer for the head area than fore the handgrip portion of the brush. As above, the head may then be tufted using conventional staple technology.

Figure 9:
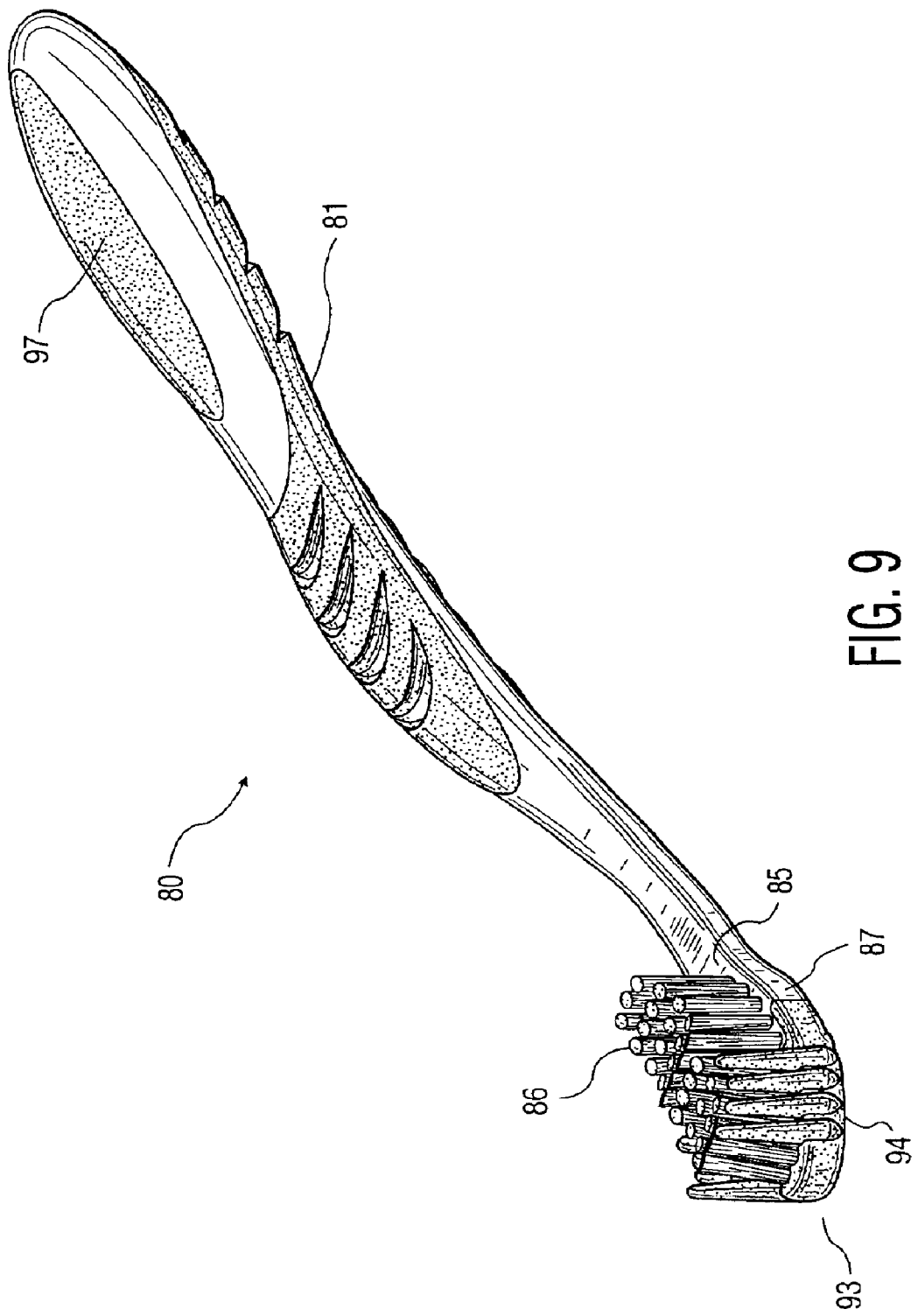
FIG. 9 is a perspective view of a toothbrush in a normal configuration according to an embodiment of the present invention.
Figure 10:
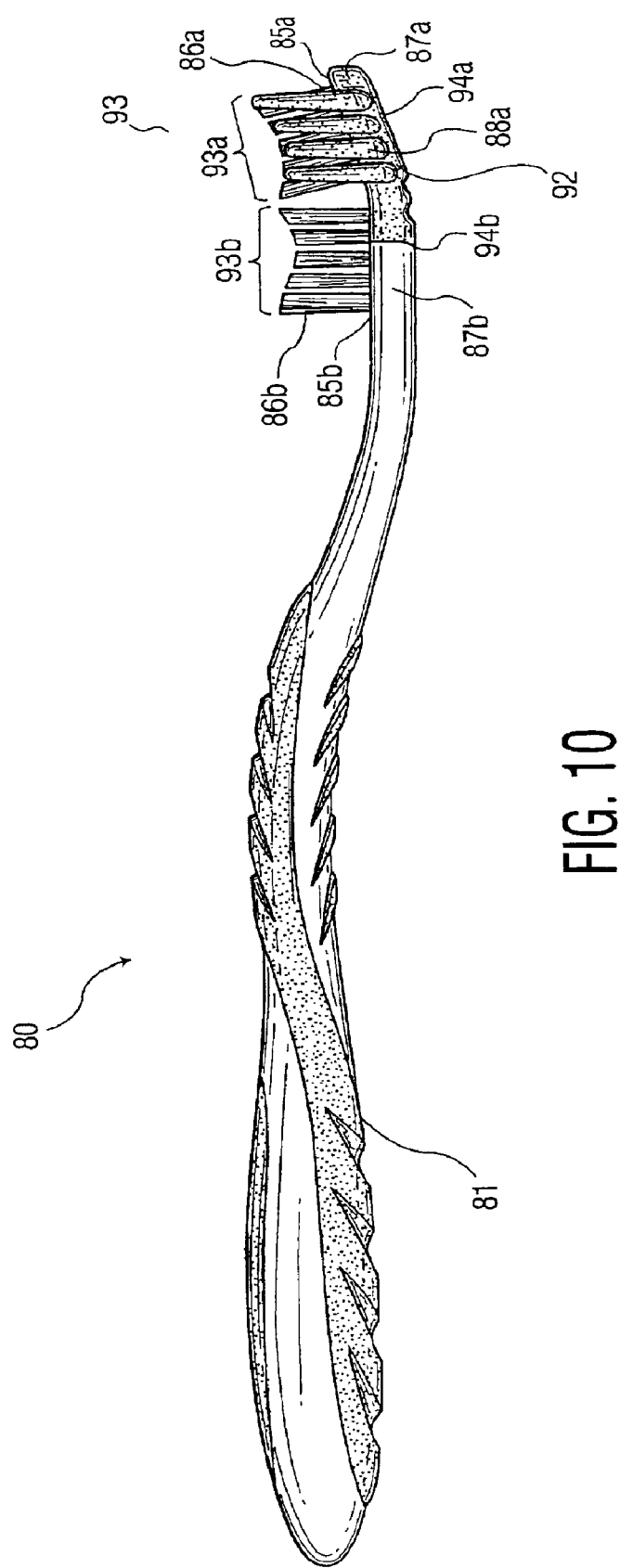
FIG. 10 is a side view of a toothbrush in a normal configuration according to an embodiment of the present invention.
Figure 11:
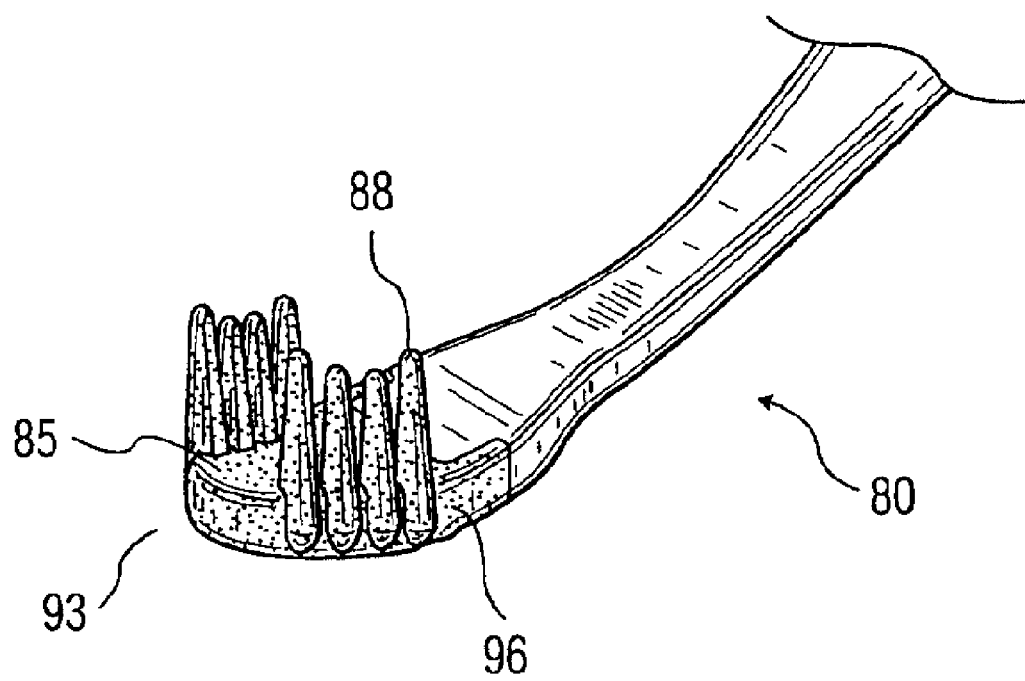
FIG. 11 is a perspective view of a toothbrush head in a normal configuration according to an embodiment of the present invention.

In another embodiment as illustrated in FIG. 9, the present invention provides a toothbrush 80 having a handle 81 and an articulated head 93 coupled to handle 81. Head 93 includes a bottom surface 85, a first side surface 87, a second side surface 96 (not shown) and a top surface 94. A plurality of bristles 86 extends from the bottom surface 85 of head 93 in a direction generally orthogonal to the bottom surface 85. As illustrated in FIG. 10, head 93 may include two sections 93*a* and 93*b*. Head section 93*a* includes a bottom surface 85*a*, a first side surface 87*a*, a second side surface 96*a* (not shown), and a top surface 94*a*. Head section 93*b* includes a bottom surface 85*b*, a first side surface 8*b*, a second side surface 96*b* (not shown), and a top surface 94*b*. Each of the head sections 93*a*/93*b* has a respective plurality of bristles 86*a*/86*b* extending from the respective bottom surface 85*a*/85*b* thereof. In particular, head section 93*a* has a plurality of bristles 86*a* extending from bottom surface 85*a* and head section 93*b* has a plurality of bristles 86*b* extending from bottom surface 85*b*. As seen in FIG. 11, at least one of the head sections has a plurality of elastomeric fingers 88 partially defining the first and/or second side surface of the head section and partially extending from the bottom surface of the first and/or second side surface. The plurality of elastomeric fingers 88 is adapted to provide, for example, massaging action to the gums when toothbrush 80 is applied along the gumline and the elastomeric fingers 88 are contacted with the gum.

As seen in FIGS. 9–20, the plurality of elastomeric fingers 88 may extend in a direction generally orthogonal to the bottom surface. As seen in FIGS. 9–20, the plurality of elastomeric fingers 88 may also extend in a direction substantially parallel to either the plurality of bristles 86*a* or the plurality of bristles 86*b*. In one embodiment, there is about a 150 angle between each of the fingers of the plurality of elastomeric fingers 88 and each of the bristles of the plurality of bristles 86.

Figure 12:
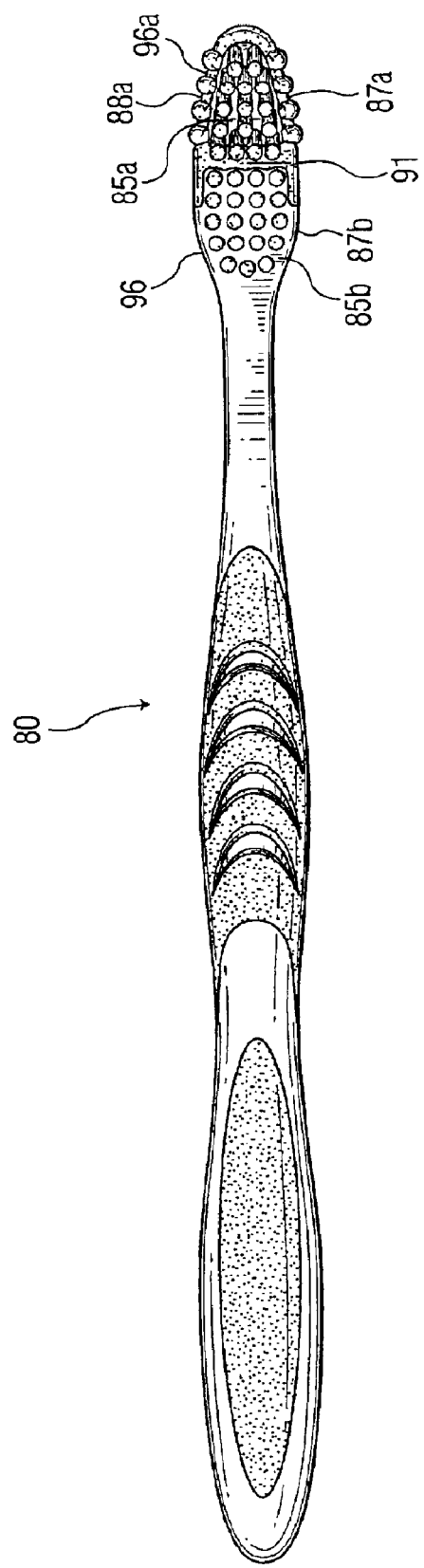
FIG. 12 is a view of the bottom surface of a toothbrush in a normal configuration according to an embodiment of the present invention.
Figure 13:
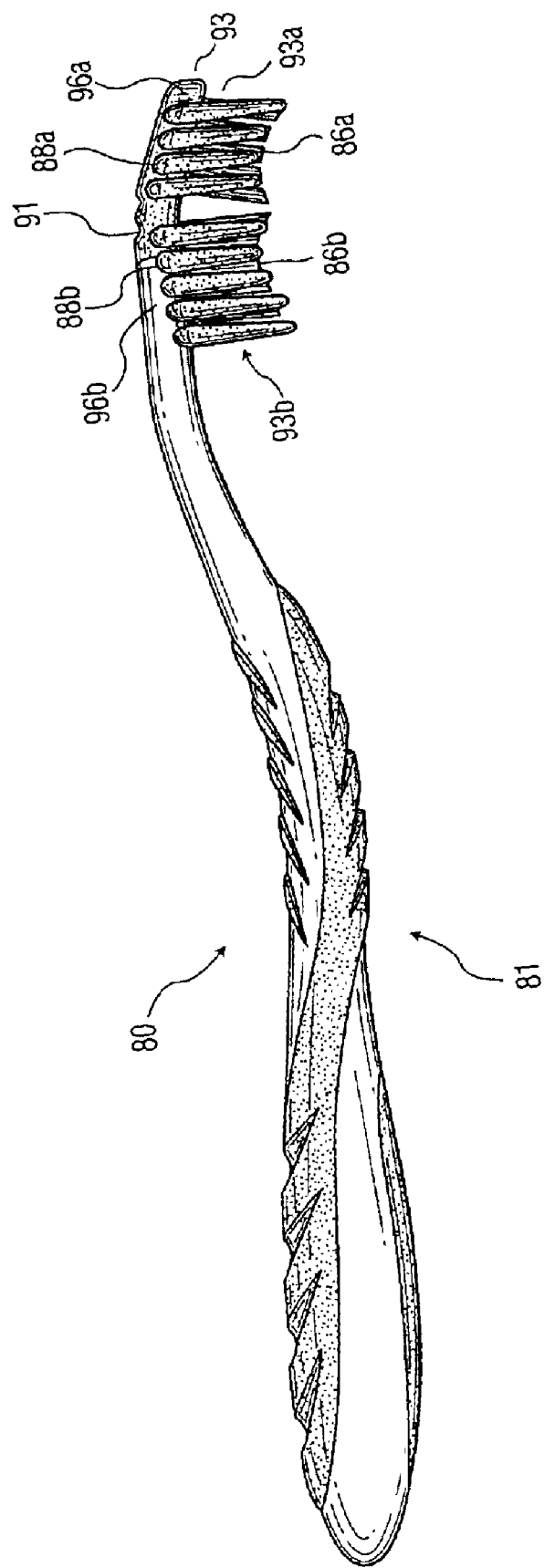
FIG. 13 is a side view of a toothbrush in a normal configuration according to an embodiment of the present invention.

The plurality of elastomeric fingers 88 may partially define a first and/or second side surface of one head section or both head sections. FIG. 10 depicts a plurality of elastomeric fingers 88*a* partially defining first side surface 87*a* of head section 93*a*. FIG. 12 depicts a plurality of elastomeric fingers 88*a* partially defining second side surface 96*a* of head section 93*a* in addition to first side surface 87*a*. FIG. 13 depicts a plurality of elastomeric fingers 88 partially defining second side surface 96*a* of head section 93*a* and second side surface 96*b* of head section 93*b*. FIG. 11 depicts a plurality of elastomeric fingers 88 partially defining first side surface 87 (not shown) and second side surface 96 of head 93 (elastomeric fingers 88 partially define both side surfaces of both head sections). It will be understood that the present invention contemplates any combination of arrangement of the plurality of elastomeric fingers 88. By partially defining the side surface of head section 93, the plurality of elastomeric fingers does not sacrifice the amount or surface area of the plurality of bristles 86.

Figure 14:
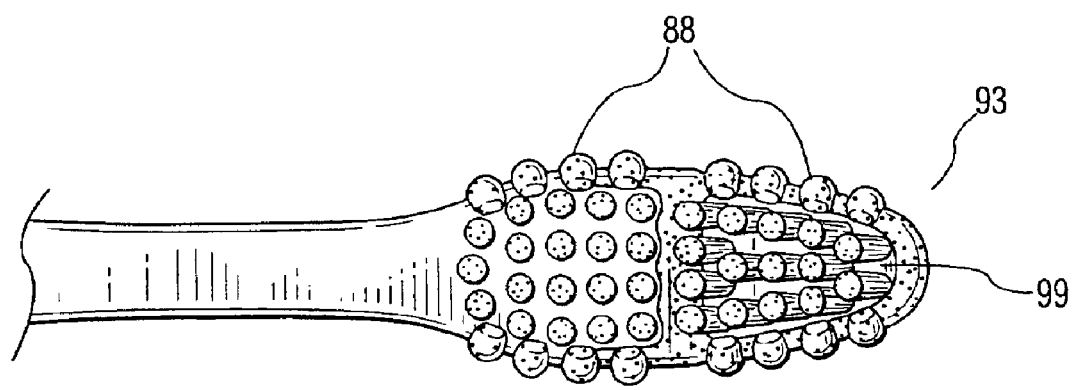
FIG. 14 is a view of the bottom surface of a toothbrush in a normal configuration according to an embodiment of the present invention.
Figure 15:
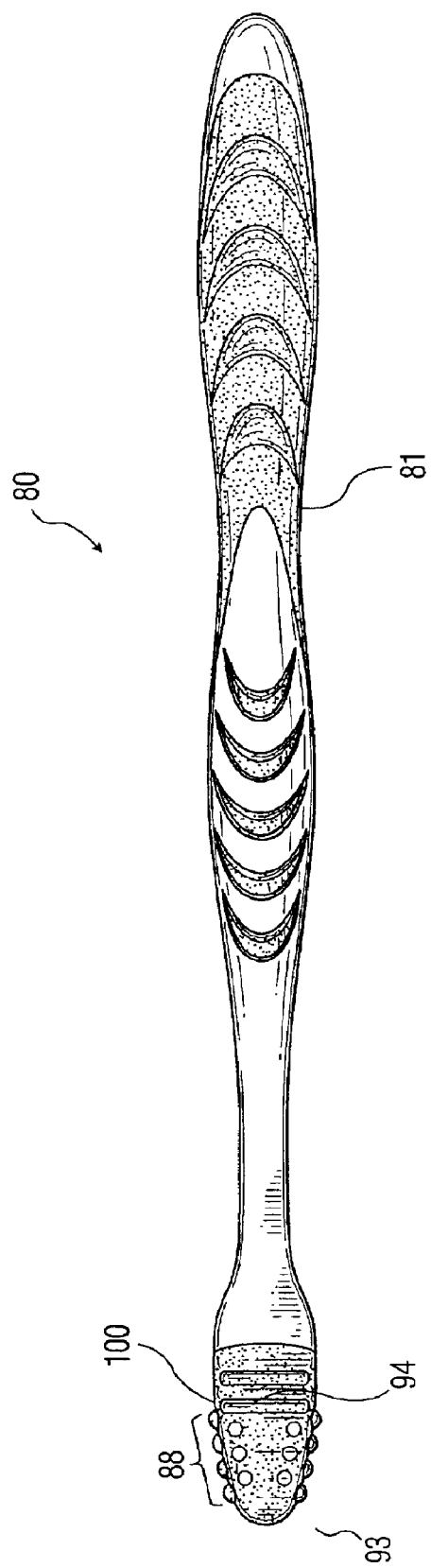
FIG. 15 is a view of the top surface of a toothbrush according to an embodiment of the present invention.

As shown in FIG. 14, head 93 may have a primary brushing area 99, and the plurality of elastomeric fingers 88 may be outside or outboard the primary brushing area 99 of head 93. Top surface 94 of head 93 may be defined by a periphery 100, and elastomeric fingers 88 may extend outside of periphery 100 of top surface 94 as illustrated in FIG. 15. In an embodiment, positioning the elastomeric fingers 88 outside of the primary brushing area 99 may allow the elastomeric fingers 88 to better hit the gumline of a user. In addition, the elastomeric fingers 88 may not use any, or as much of the tooth-cleaning bristle area. In addition, positioning the elastomeric fingers 88 outside of the primary brushing area 99 may facilitate the stapling, trimming and end rounding manufacturing process, especially where the tips of the elastomeric fingers 88 are the same height as the tufts of bristle behind each finger. As depicted in FIG. 10 and FIG. 13, head section 93a, in a normal configuration of head 93, may be angled with respect to head section 93b. The angled configuration of head section 93a may allow toothbrush 80 greater access to hard-to-reach areas, such as the lingual surfaces of the front teeth and behind the rear molars, and place more bristle in contact with the outer surface of the front teeth.

Figure 16:
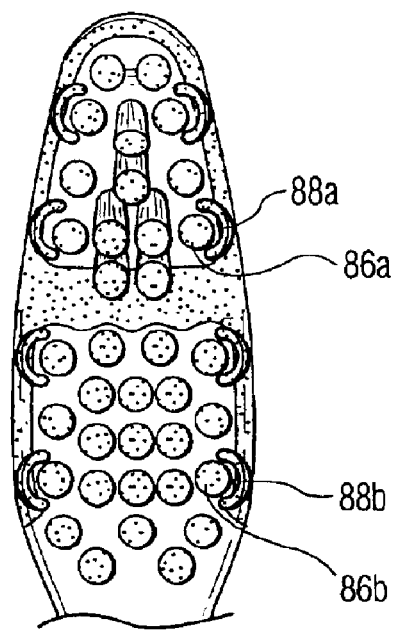
FIG. 16 is a view of the bottom surface of a toothbrush head according to an embodiment of the present invention.
Figure 17:
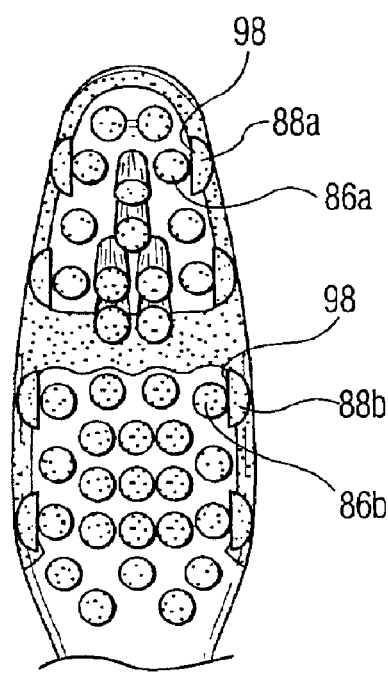
FIG. 17 is a view of the bottom surface of a toothbrush head according to an embodiment of the present invention.

With respect to the dimensions of the elastomeric fingers 88, the plurality of elastomeric fingers may be of uniform length, of uniformly different lengths, or of non- uniformly different lengths. In a preferred embodiment, as illustrated in FIGS. 10 and 13, the lengths of the elastomeric fingers 88 approximately follow the curved contour formed by the free ends of the plurality of bristles 86. In particular, the elastomeric fingers 88a follow the curved contour formed by the free ends of the plurality of bristles 86a and the elastomeric fingers 88b follow the curved contour formed by the free ends the plurality of bristles 86b. The elastomeric fingers 88 may be configured in any shape. For example, as illustrated in FIG. 16, each of the plurality of elastomeric fingers 88a/88b is C-shaped. Due to this C-shape, a finger 88 may partially encircle a tuft of bristles 86a/86b and may aid in a flossing ability of the tuft of bristles by enabling the tuft of bristles 86a/86b to remain substantially rigid or preventing the bristles from substantially flexing. This flossing ability refers to the ability of bristles 86a/86b to access areas between teeth. The C-shape of each of the elastomeric fingers 88a/88b is only one example of a configuration that may facilitate the flossing ability of the bristles 86a/86b. If such a function is desired, the elastomeric fingers 88a/88b may be configured in any shape suitable to promote the flossing ability of the bristles 86a/86b. In an alternative embodiment, as illustrated in FIG. 17, each of the plurality of elastomeric fingers 88a/88b is D-shaped. In such a configuration, a side surface 98 of the plurality of elastomeric fingers 88a/88b facing the plurality of bristles 86a/86b is substantially flat, to provide extra clearance between the bristles and the elastomeric fingers.

Each of the plurality of elastomeric fingers 88 may be discrete as illustrated in FIGS. 9–16, or the bottom ends of the plurality of elastomeric lingers 88 maybe attached or connected to other elastomeric fingers 88 in some manner. By "bottom end," what is meant is the portion of the elastomeric fingers 88 closest to top surface 94. If each of the plurality of elastomeric fingers is discrete, the bottom ends of the elastomeric fingers 88 may be at varying distances from top surface 94. The top end of the plurality of elastomeric fingers 88 may be substantially rounded or flat. By "top end," what is meant is the portion of the elastomeric fingers 88 farthest from top surface 94. The top end may be configured in any shape and may be suitable for the function of providing a massaging action to the gums when toothbrush 90 is applied along the gumline and the elastomeric fingers 88 are contacted with the gums.

The plurality of elastomeric fingers 88 maybe composed of an elastomeric material, such as, for example, TPV and other elastomeric materials previously mentioned and discussed. Preferably, the shore hardness value of the elastomeric material is less than 30. More preferably, the shore hardness value of the elastomeric material is between about 23 and 28.

Figure 18:
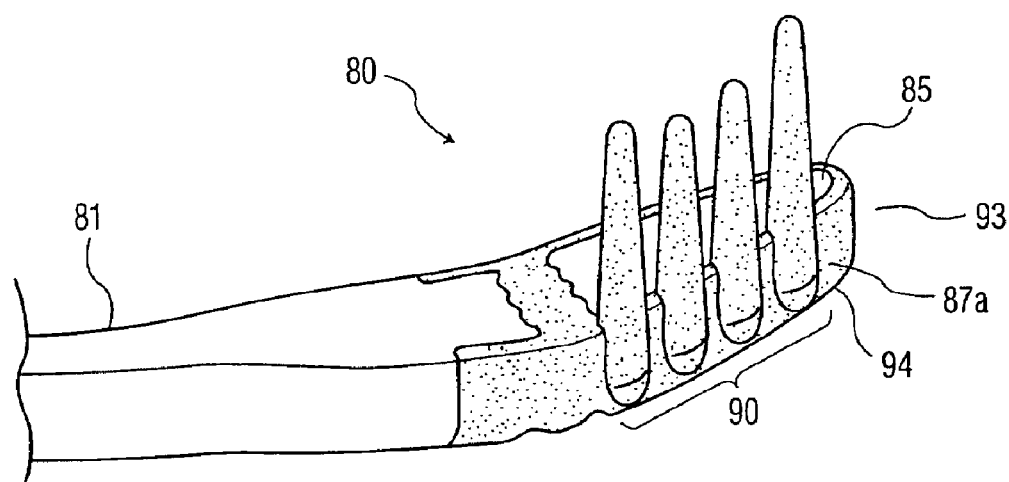
FIG. 18 is a perspective view of a toothbrush head in a normal configuration according to an embodiment of the present invention.
Figure 19:
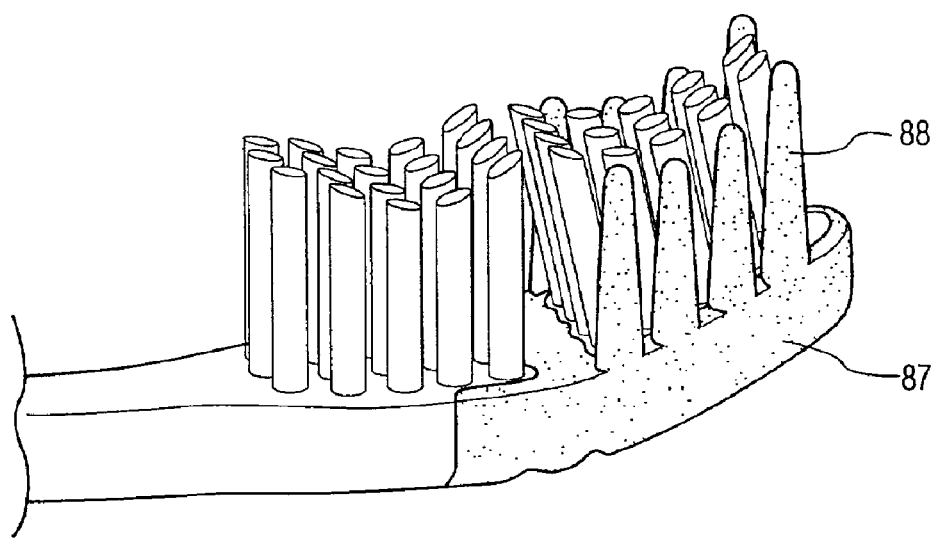
FIG. 19 is a side view of a toothbrush head in a normal configuration according to an embodiment of the present invention.

In an embodiment of present invention as illustrated in FIG. 18, toothbrush 80 includes a handle 81 (partially shown) and an articulated head 93 coupled to the handle 81. Head 93 includes a bottom surface 85, a first side surface 87, a second side surface 96 (not shown), and a top surface 94. Although not specifically illustrated in FIG. 15, head 93 may include two sections 93a and 93b. Each of the head sections 93a/93b may have a plurality of bristles 86 (not shown) extending from the respective bottom surface thereof. At least one of the head sections has a plurality of elastomeric fingers 88 partially defining ridges 90 of a respective side surface thereof. The ridges 90 form a convoluted side surface adapted to provide, for example, a massaging action to gingival or oral tissue such as the inner cheeks and tongue when toothbrush 80 is applied to teeth and ridges 90 are contacted with the oral tissue. In one embodiment head section 93a, in a normal configuration of head 93, is angled with respect to head section 93b. In another embodiment as illustrated in FIG. 19, the plurality of elastomeric fingers 88 defines a smooth side surface 87.

In an embodiment as illustrated in FIG. 12 and FIG. 13, toothbrush 80 includes a flex area 91, which may include an elastomeric material. In an embodiment as illustrated in Fig. 13, wherein head section 93a is angled with respect to head section 93b, the deformability of flex area 91 permits head section 93a to partially or completely align itself with handle 81 and head section 93b. In another embodiment as depicted in FIG. 10, head section 93a includes an elastomeric area 92, which for example includes first side surface 87a, second side surface 96a (not shown), and top surface 94a. Handle 81 may also include an elastomeric section 97, as illustrated in FIG. 9. The elastomeric fingers 88, the flex area 91, the elastomeric area 92 of head section 93a, and the elastomeric section 97 of handle 81 may be composed of the same elastomer or different elastomers. In an embodiment, the elastomeric fingers 88 extend from the elastomeric area 92 of head section 93a. This embodiment may provide improved fit and control of the brush head when used to brush teeth. In an embodiment, the elastomeric fingers 88 may generate more motion, and may generate more movement along the gum line, when the head is straightened.

With respect to bristles 86, in one embodiment, at least of some of the bristles 86a/86b extending from bottom surface 85a/85b of head section 93a/93b are of uniformly different lengths as illustrated in FIGS. 10 and 13. As seen from these FIGS., the tips of bristles 86a/86b may form a generally concave brushing surface, which is at times during brushing, flattened upon bending of the head. In an alternative embodiment, at least some free ends of the plurality of bristles 86 extending from one of the head sections forms a slant with respect to the bottom surface of the head section. For example, as seen in FIG. 10, at least some of the free ends of the plurality of bristles 86a extending from bottom surface 85a of head section 93a form a slant with respect to bottom surface 85a of head section 93a.

In an embodiment as illustrated in FIG. 13, the geometry of toothbrush 80 is such that if toothbrush 80 is in a resting position on a flat surface and bottom surface 85 of head 93 is facing the flat surface, the plurality of elastomeric fingers 88 do not contact the flat surface. By "resting position," what is meant is a position such that no external pressure is applied to the plurality of elastomeric fingers 88 other than the pressure applied by the flat surface. According to one manufacturing method of toothbrush 80, after toothbrush 80 has been molded via an injection molding machine, the molded toothbrush 80 (without bristles) drops from the molding machine onto a flat surface of a cooling conveyor. Handle 81 then rolls either onto a table or in a bin. The plurality of bristles 86 is then stapled into head 93. According to this embodiment, the geometry of toothbrush 80 is such that handle 81 may lay many position without resulting in the elastomeric fingers 88 being bent by the pressure exerted on the elastomeric fingers 88 by the flat surface of the conveyor.

Figure 20:
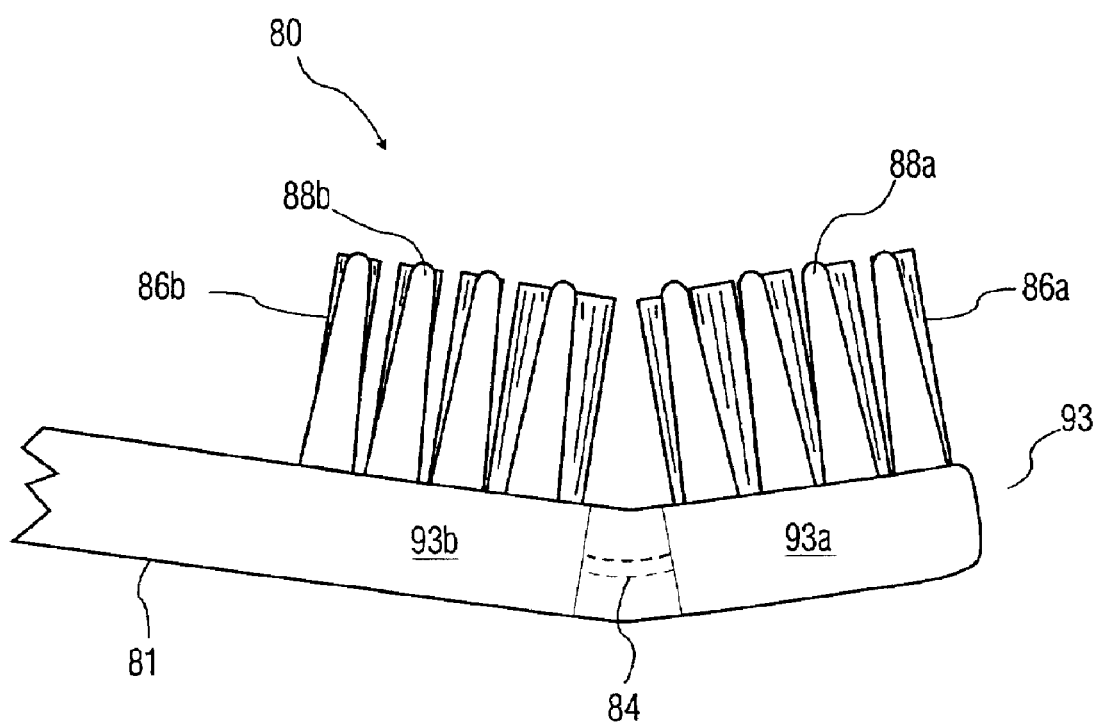
FIG. 20 is a side view of a toothbrush in a normal configuration according to an embodiment of the present invention.

In yet another embodiment of the present invention as illustrated in FIG. 20, toothbrush 80 includes a handle 81 (partially shown) and an articulated head 93 joined to handle 81. The articulated head 93 may include a first section 93a and a second section 93b. At least part of the handle 81, the first section 93a and the second section 93b is integrally molded of the same material. The first section 93a includes a first plurality of bristles 86a and the second section 93b includes a second plurality of bristles 86b. The first plurality of bristles 86a extends generally orthogonally from first section 93a and the second plurality of bristles 86b extends generally orthogonally from second section 93b. At least one of the first section 93a and the second section 93b includes a plurality of elastomeric fingers 88a/88b defining a respective side surface thereof. The first section 93a and the second section 93b are the only sections of the articulated head 93 that include bristles. First section 93b is the only one of the sections joined to handle 81. Second section 93a is joined to first section 93b by at least one bridge 84. Second section 93a, in a normal configuration of articulated head 93, is angled with respect to first section 93b.

What is claimed is:

1. A toothbrush comprising:
   a handle; and
   an articulated head coupled to the handle, the articulated head including two sections, each of the head sections having a bottom surface and a side surface, each of the head sections including a plurality of bristles extending from the respective bottom surface thereof, at least one of the head sections including a plurality of elastomeric fingers partially defining the side surface of that head section and partially extending from the bottom surface of that head section, wherein the head section most remote from the handle, in a normal configuration of the articulated head, is angled with respect to the other head section.

2. The toothbrush of claim 1, wherein at least some of the elastomeric fingers are of different lengths.

3. The toothbrush of claim 2, wherein the plurality of tufts of bristles have differing lengths such that free ends of the plurality of tufts of bristles form a curved contour, and wherein the lengths of at least some of the elastomeric fingers follow the curved contour of the free ends of the plurality of tufts of bristles.

4. The toothbrush of claim 1, wherein at least some of the free ends of the plurality of bristles extending from one of the head sections forms a slant with respect to the bottom surface of the head section.

5. The toothbrush of claim 1, wherein the Shore hardness value of the elastomeric fingers is below 30.

6. The toothbrush of claim 1, wherein a side surface of each of the plurality of elastomeric fingers facing the plurality of bristles is substantially flat.

7. The toothbrush of claim 1, wherein each of the elastomeric fingers of the plurality of elastomeric fingers is substantially D-shaped.

8. The toothbrush of claim 1, wherein each of the elastomeric fingers of the plurality of elastomeric fingers is substantially C-shaped.

9. The toothbrush of claim 1, further comprising a flex area between facing ends of the two head sections.

10. The toothbrush of claim 1, wherein the handle has an area that is composed of an elastomeric material, and wherein the plurality of elastomeric fingers are composed of the same elastomeric material as the elastomeric area in the handle.

11. The toothbrush of claim 1, wherein the head section most remote from the handle has a side surface partially defined by the elastomeric fingers.

12. The toothbrush of claim 1, wherein the toothbrush has a geometry such that if the toothbrush is in a resting position on a flat surface and the bottom surface of the head is facing the flat surface, the elastomeric fingers will not contact the flat surface.

13. A toothbrush comprising:
    a handle; and
    an articulated head coupled to the handle, the articulated head including two sections, each of the head sections having a bottom surface and a side surface, each of the head sections including a plurality of bristles extending from the respective bottom surface thereof, at least one of the head sections including a plurality of elastomeric fingers partially defining ridges on the side surface of that head section, wherein the head section most remote from the handle, in a normal configuration of the articulated head, is angled with respect to the other head section.

14. The toothbrush of claim 13, wherein at least some of the elastomeric fingers are of different lengths.

15. The toothbrush of claim 14, wherein the plurality of tufts of bristles have differing lengths such that free ends of the plurality of tufts of bristles form a curved contour, and wherein the lengths of at least some of the elastomeric fingers follow the curved contour of the free ends of the plurality of tufts of bristles.

16. The toothbrush of claim 13, wherein at least some of the free ends of the plurality of bristles extending from one of the head sections forms a slant with respect to the bottom surface of the head section.

17. The toothbrush of claim 13, wherein the Shore hardness value of the elastomeric fingers is below 30.

18. The toothbrush of claim 13, wherein a side surface of each of the plurality of elastomeric fingers facing the plurality of bristles is substantially flat.

19. The toothbrush of claim 13, wherein each of the plurality of elastomeric fingers is substantially D-shaped.

20. The toothbrush of claim 13, wherein each of the plurality of elastomeric fingers is substantially C-shaped.

21. The toothbrush of claim 13, further comprising a flex area between facing ends of the two head sections.

22. The toothbrush of claim 13, wherein the handle has an area that is composed of an elastomeric material, and wherein the plurality of elastomeric fingers is composed of the same elastomeric material as the elastomeric area in the handle.

23. The toothbrush of claim 13, wherein the head section most remote from the handle has elastomeric fingers that partially define ridges of the side surface of the head section.

24. The toothbrush of claim 13, wherein the toothbrush has a geometry such that if the brush is in a resting position on a flat surface and the bottom surface of the head is facing the flat surface, the elastomeric fingers will not contact the flat surface.

25. A toothbrush comprising:

a handle; and an articulated head joined to the handle, the articulated head including a first section and a second section, at least part of the handle, the first section and the second section being integrally molded of the same material, the first section including a first plurality of tufts of bristles and the second section including a second plurality of tufts of bristles, the first plurality of tufts of bristles extending generally orthogonally from the first section and the second plurality of tufts of bristles extending generally orthogonally from the second section, at least one of the first section and the second section including a plurality of elastomeric fingers partially defining a respective side surface thereof, the first section and the second sections of the articulated head being the only head sections of the articulated head including bristles, the first section being the only one of said sections joined to the handle, the second section being joined to the first section by at least one bridge, the second section, in a normal configuration of the articulated head, being angled with respect to the first section.

26. The toothbrush of claim 25, wherein the plurality of elastomeric fingers partially extends from the bottom surface of at least one of the head sections.

27. The toothbrush of claim 25, wherein at least some of the elastomeric fingers are of different lengths.

28. The toothbrush of claim 27, wherein the plurality of tufts of bristles have differing lengths such that free ends of the plurality of tufts of bristles form a curved contour, and wherein the lengths of at least some of the elastomeric fingers follow the curved contour of the free ends of the plurality of tufts of bristles.

29. The toothbrush of claim 25, wherein at least some of the free ends of the plurality of bristles extending from one of the head sections forms a slant with respect to the bottom surface of the head section.

30. The toothbrush of claim 25, wherein the Shore hardness value of the elastomeric fingers is below 30.

31. The toothbrush of claim 25, wherein a side surface of each of the plurality of elastomeric fingers facing the plurality of bristles is substantially flat.

32. The toothbrush of claim 25, wherein each of the plurality of elastomeric fingers is substantially D-shaped.

33. The toothbrush of claim 25, wherein each of the plurality of elastomeric fingers is substantially C-shaped.

34. The toothbrush of claim 25, further comprising a flex area between facing ends of the two head sections.

35. The toothbrush of claim 25, wherein the handle has an area that is composed of an elastomeric material, and wherein the plurality of elastomeric fingers are composed of the same elastomeric material as the elastomeric area in the handle.

36. The toothbrush of claim 25, wherein the head section most remote from the handle has a side surface partially defined by the elastomeric fingers.

37. The toothbrush of claim 25, wherein the toothbrush has a geometry such that if the brush is in a resting position on a flat surface and the bottom surface of the head is facing the flat surface, the elastomeric fingers will not contact the flat surface.

38. A toothbrush comprising:

a handle; and an articulated head, said head having at least two sections to thereby define a composite head having an upper surface and a lower surface and a side surface, said at least two sections having respective longitudinally spaced ends facing each other, each of said head sections having a plurality of tufts of bristles extending from a lower surface thereof, said facing ends having an elastomeric material that extends between said head sections and forms at least a portion of the side surface, wherein, at least some of the tufts extending from the lower surface of one of said head sections are of uniformly different lengths.

39. A toothbrush comprising:

a handle; and an articulated head, said head having at least two sections to thereby define a composite head having an upper surface and a lower surface, said at least two sections having respective longitudinally spaced ends facing each other, each of said head sections having a plurality of tufts of bristles extending from a lower surface thereof, said facing ends having an elastomeric material therebetween, wherein, at least some of the tufts extending from the lower surface of one of said head sections are of uniformly different lengths; wherein the head has a primary brushing area, and wherein at least one of the head sections includes a plurality of elastomeric fingers positioned outboard the primary brushing area.

40. A toothbrush comprising:

a handle and an articulated head, said head having at least two sections to thereby define a composite head having an upper surface and a lower surface, said at least two sections having respective longitudinally spaced ends facing each other, each of said head sections having a plurality of tufts of bristles extending from a lower surface thereof, said facing ends having an elastomeric material therebetween, wherein, at least some of the tufts extending from the lower surface of one of said head sections are of uniformly different lengths; wherein a plurality of elastomeric fingers partially defines a convoluted elastomer edge of at least one of the head sections.

* * * * *